United States Patent [19]

Goldberg

[11] Patent Number: 5,531,405

[45] Date of Patent: Jul. 2, 1996

[54] METHOD OF BUILDING AN EXPULSIVE BLANKET USING COMPOSITE MATERIALS AND STITCHED ATTACHMENT

[75] Inventor: Joshua I. Goldberg, Woodbridge, Conn.

[73] Assignee: Dynamics Controls Corporation, South Windsor, Conn.

[21] Appl. No.: 294,640

[22] Filed: Aug. 23, 1994

[51] Int. Cl.$^6$ .................................................. B64D 15/20
[52] U.S. Cl. ........................................................ 244/134 B
[58] Field of Search ........................... 244/134 R, 134 B, 244/134 D; 310/10

[56] References Cited

U.S. PATENT DOCUMENTS

| | | | |
|---|---|---|---|
| 2,439,037 | 4/1948 | Campbell | 244/134 A |
| 3,370,814 | 2/1968 | Kageorge et al. | 244/134 A |
| 3,690,601 | 9/1972 | Roemke | 244/134 A |
| 4,875,644 | 10/1989 | Adams et al. . | |
| 4,894,569 | 1/1990 | Lardiere, Jr. et al. . | |
| 4,982,121 | 1/1991 | Lardiere, Jr. et al. . | |
| 5,022,612 | 6/1991 | Berson . | |
| 5,107,154 | 4/1992 | Goldberg et al. . | |
| 5,112,011 | 5/1992 | Weisend, Jr. et al. . | |
| 5,129,598 | 7/1992 | Adams et al. . | |
| 5,143,325 | 9/1992 | Zieve et al. . | |
| 5,152,480 | 10/1992 | Adams et al. . | |
| 5,248,116 | 9/1993 | Rauckhorst . | |
| 5,272,400 | 12/1993 | Goldberg et al. . | |
| 5,310,142 | 5/1994 | Weisend, Jr. | 244/134 A |
| 5,314,145 | 5/1994 | Rauckhorst, III | 244/134 A |

Primary Examiner—Galen L. Barefoot
Attorney, Agent, or Firm—McCormick, Paulding & Huber

[57] ABSTRACT

A composite fabric electro-expulsive blanket is provided for shattering and removing ice and other fungible material from an accretion surface such as an airfoil. The blanket includes composite fabric upper and lower layers having a modulus of elasticity approximately between 10 to 100 million psi. Upper and lower conductor segments are positioned within the blanket so that when electrically energized, they repel one another so as to rapidly set the outer ice-accreting surface into motion. Bowed or loose stitches connecting the outer and inner layers become taut during the motion of the ice-accretion surface, thereby rapidly decelerating the surface and shattering accumulated ice thereon. Slits in the outer layer limit undesired hoop stress.

15 Claims, 2 Drawing Sheets

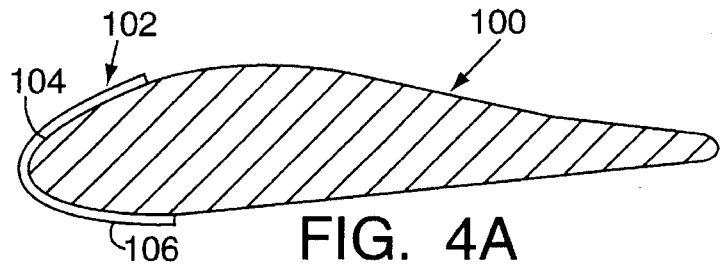
FIG. 3
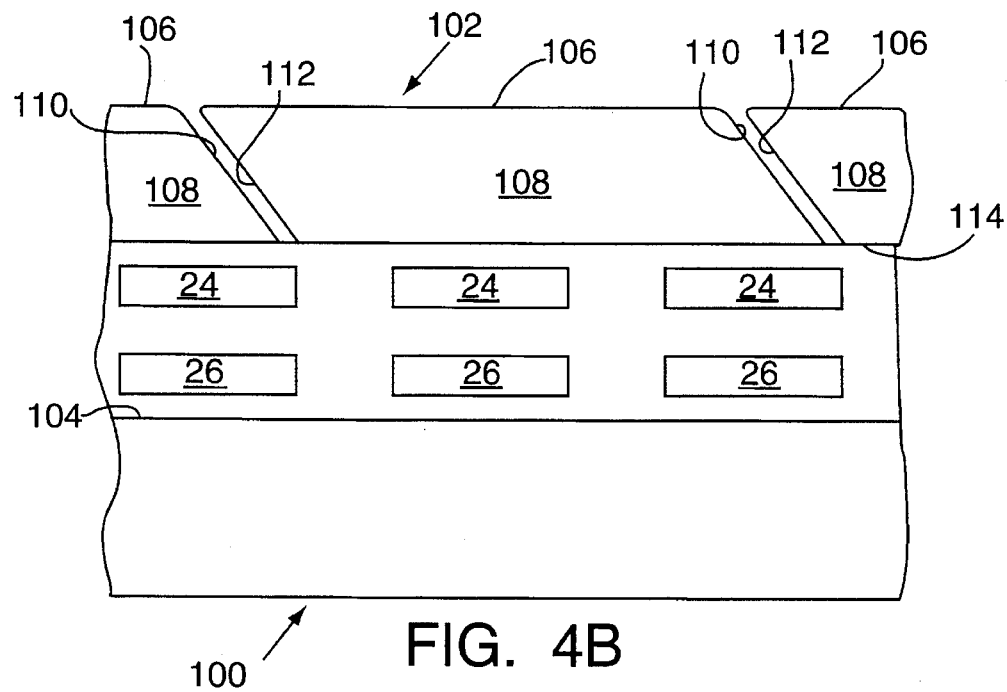
FIG. 4A
FIG. 4B

METHOD OF BUILDING AN EXPULSIVE BLANKET USING COMPOSITE MATERIALS AND STITCHED ATTACHMENT

BACKGROUND OF THE INVENTION

The present invention relates to a de-icer for removing unwanted material from objects, and relates more particularly to an electro-expulsive blanket for shattering and removing ice and other fungible material from an accreting surface such as that of an airfoil.

Presently, electro-expulsive blankets are used to remove ice from certain areas of airfoils most vulnerable to ice accretion. For instance, electro-expulsive blankets typically cover an exposed or leading edge of a plane's airfoil. These blankets typically comprise an elastomeric outer layer having a lower surface attached to the outer surface of an airfoil to be protected from ice accretion and having an upper or ice-accretion surface exposed to the elements. Within the blanket are two layers of conductor windings that when electrically energized repel one another so as to cause the accretion surface of the blanket to move outwardly and rapidly away from the relatively stationary lower surface. The stretched and outwardly moving accretion surface of the outer elastomeric layer combines with a restoring spring within the blanket to generate a restoring force to decelerate the accretion surface's outward movement. The rapid deceleration of the ice-accretion surface shatters and removes any accumulated ice which is bonded to the accretion surface.

One drawback with using elastomeric outer-layer blankets is that the shedding efficiency (Watts per unit area shed) is relatively low as compared to stiffer materials, such as composite fabrics. A second drawback is that the shedding efficiency of elastomeric blankets is reduced by the limited non-linearity of conventionally used restoring springs located within the blanket. A third drawback with elastomeric blankets is a short operational life because of the relatively low erosion resistance of elastomeric materials as compared to composite fabrics.

Accordingly, it is a general object of the present invention to provide an electro-expulsive blanket with a composite fabric outer layer for improved shedding efficiency and erosion resistance over that of blankets using conventional elastomeric outer layers.

It is another object of the present invention to provide a novel inner restoring force from within the composite fabric blanket to further improve shedding efficiency.

It is a further object of the present invention to provide slits through the composite fabric outer layer to limit damaging hoop stress which arises when the relatively stiff composite fabric blanket is fired.

SUMMARY OF THE INVENTION

The invention meets these and other objectives by providing a composite fabric electro-expulsive blanket for shattering and removing ice and other fungible material from an accretion surface such as an airfoil. The blanket includes a composite fabric layer including a lower layer to be attached to a protected surface and an upper layer having an ice-accretion surface to be exposed to the elements. Preferably, the upper layer of the blanket has a plurality of splits extending through an outer portion of the upper layer for limiting hoop stress to acceptable levels when the blanket is fired so that the blanket does not structurally fail. The composite fabric layer exhibits a relatively high modulus of elasticity, such as approximately between 10 million to 100 million pounds per square inch, with respect to elastomeric materials. A plurality of upper conductor segments are periodically spaced from one another and form two-dimensional patterns extending in a plane parallel to the ice-accretion surface. These upper conductor segments are attached to the upper layer. Likewise, a plurality of lower conductor segments are periodically spaced from one another and form two-dimensional patterns extending in a plane parallel to the ice-accretion surface. These lower conductor segments are attached to the lower layer. Each of the lower conductor segments are arranged in an underlying relationship to respective upper conductor segments. The upper and lower conductor segments are to be connected to one or more power sources and arranged in such a way that the upper conductor segments move rapidly and upwardly away from the lower conductor segments and the lower layer when the upper and lower conductor segments are energized by an electric current. The upwardly moving upper conductor segments transfer their motion to the upper layer and the ice-accretion surface. Stitches connect the upper layer to the lower layer. The stitches are bowed or slack when the conductor segments are unenergized and become straight or taut so as to act as a restoring force to the ice-accretion surface as the surface stretches and moves away from the lower layer when the conductor segments are energized. The stretched ice-accretion surface and the restoring force of the stitches when they become taut cause a rapid deceleration in the upward motion of the ice-accretion surface so as to shatter any ice which may have accumulated on the ice-accretion surface. An electrically insulating layer may be positioned between the upper and lower conductor segments. Furthermore, it is preferable to fill any voids between the conductors with elastomeric material that can be attached to the upper and lower layers.

BRIEF DESCRIPTION OF THE DRAWINGS

FIG. 3 is a table showing various moduli of elasticity of fibers and resins making up composite fabrics which may be used in the present invention.

FIG. 4A is a vertical cross section of an airplane wing covered at its front end with an electro-expulsive blanket in accordance with the present invention.

FIG. 4B is an enlarged cross section of FIG. 4A rotated 90° clockwise and showing the split in the composite fabric outer layer of the electro-expulsive blanket for reducing hoop stress to acceptable levels when the blanket is fired.

DESCRIPTION OF THE PREFERRED EMBODIMENT

Figure 1:
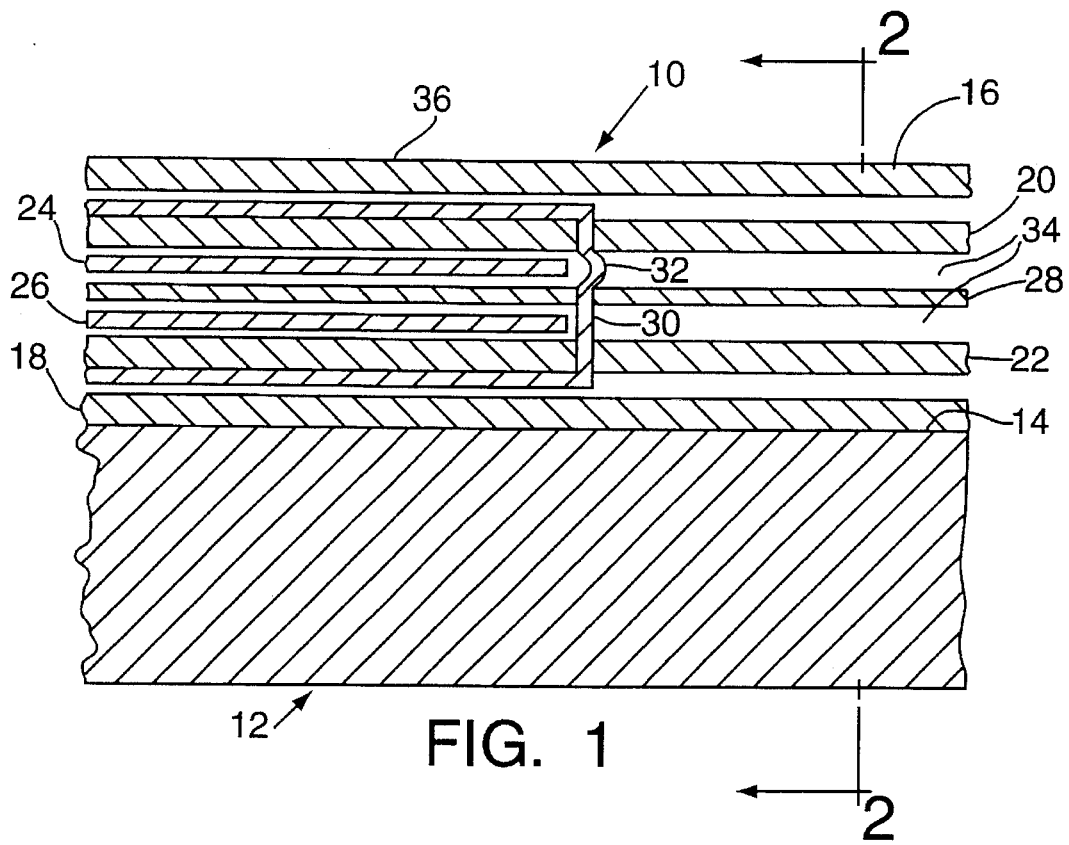
FIG. 1 is a vertical section of an electro-expulsive blanket showing the composite layers, the conductors and the bowed stitching holding the inner composite fabric layers together.
Figure 2:
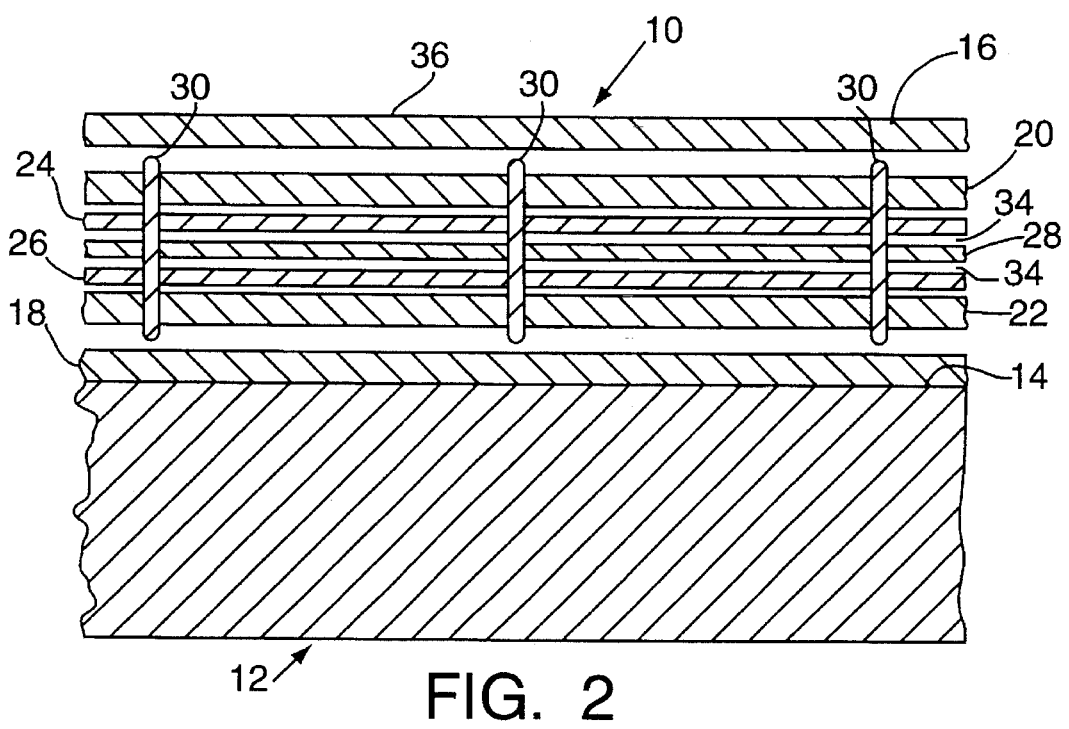
FIG. 2 is a vertical section of the electro-expulsive blanket of FIG. 1, as seen along the lines 2—2.

FIGS. 1 and 2 are vertical sections of an embodiment of an electro-expulsive blanket indicated generally by the reference numeral 10. The blanket is used for covering a protected object 12, such as an outer surface 14 of an airfoil to be shielded by the blanket from the accumulation of ice and other fungible material. The blanket 10 is attached by any suitable method, such as by adhesion, to the outer surface 14 of the object 12.

The blanket 10 has upper and lower outer layers 16 and 18 formed from a class of materials known as composite fabrics which are generally stiffer or more rigid materials relative to that of conventionally used elastomers. The blanket also utilizes upper and lower inner layers 20 and 22 of composite fabric material. As will be explained below, it is critical that the upper and lower outer layers 16 and 18, and the upper and lower inner layers 20 and 22 be made of composite fabric material. The upper inner layer 20 supports a plurality of upper conductor segments 24 (see also FIG. 4B showing three conductor segments) which are anchored by means such as stitches (not shown) to the upper inner layer 20. Each of the upper conductor segments are periodically spaced from one another and forms a two-dimensional pattern extending in a plane parallel to an ice-accretion surface 36. The lower inner layer 22 supports a plurality of lower conductor segments 26 (see also FIG. 4B showing three conductor segments) which are anchored by means such as stitches (not shown) to the lower inner layer 22. Each of the lower conductor segments are periodically spaced from one another and forms a two-dimensional pattern extending in a plane parallel to the ice-accreting surface 36 so as to be in an underlying relationship to a respective upper conductor segment 24. The conductor segments 24 and 26 are typically made from copper and are electrically insulated from one another by means of an insulating layer 28 typically comprising an insulating film such as "TEFLON" or an elastomeric film such as polyurethane. As best shown in FIG. 2, the upper and lower inner layers 20 and 22 are periodically and loosely attached to each other by stitches 30. The thread for the stitches is made from a strong material such as a carbon filament or a glass fiber.

The blanket 10 is typically assembled by stitching the upper and lower conductor segments 24 and 26 to the respective upper and lower inner layers 20 and 22 of composite fabric material. A filler region 34 is provided with a filler, such as an elastomeric material, capable of bonding to the upper and lower inner layers 20 and 22 in the assembly process. The filler material also provides means for relative movement between the conductor segments 24 and 26. The upper inner layer 20 is next assembled in an overlying relationship to the lower inner layer 22 with the insulating layer 28 positioned in-between. The upper and lower inner layers 20 and 22 of composite fabric material are then loosely attached to one another by the stitches 30 in order to roughly position respective upper and lower conductor segments 24 and 26 with respect to each other. As shown in FIG. 1, it is crucial to the proper functioning of the invention that the stitches 30 be bowed or slack at 32 when the conductor segments 24 and 26 are unenergized, for the purpose to be explained below. Finally, the upper and lower inner layers 20 and 22 are bonded by suitable means to the respective upper and lower outer layers 16 and 14 to form a single unit.

The operation and advantages of using composite fabric materials in combination with a bowed stitching inner arrangement will now be made apparent. The upper and lower conductor segments 24 and 26 are each connected to one or more power sources (not shown) so that when the conductor segments are energized with an electric current (blanket is fired), the conductor segments generate an electromagnetic interaction with one another which forces the upper conductor segments 24 to move rapidly and outwardly away from the respective lower conductor segments 26. The motion of the upper conductor segments is transferred to the upper outer layer 16 and its ice-accretion surface 36. When the blanket is fired, the bowed stitches 30 permit the ice-accretion surface 36 of the upper outer layer 16 to move rapidly away from the outer surface 14 of the object 12 until the slack or bow 32 in the stitches 30 is exhausted. When the slack in the bow is exhausted, the upwardly moving ice-accretion surface 36 is rapidly decelerated so as to shatter any ice on the ice-accretion surface and to break the ice-to-blanket surface bond tension.

As can be seen in FIG. 2, the stitches (typically three stitches per pair of upper and lower conductor segments) are periodically spaced from one another so that deformation of the conductor segments is also periodic during blanket firing. The periodic deformation of the conductor segments results in an enforced serpentine deformation to prevent conventional soft copper conductors from taking on a permanent "cupping" set leading to premature failure.

An advantage of using composite fabrics instead of conventional elastomers is that the greater stiffness and rigidness of composite fabrics leads to a higher shedding efficiency. In other words, less energy is wasted in deforming the stiffer, composite fabric, and more energy is harnessed to generate a rapid outward motion of the ice-accreting surface. Furthermore, the stiffness of the composite fabric coupled with the restoring force generated by the periodic inner stitching as the stitching becomes taut contributes to a substantially improved (higher) deceleration over conventional elastomeric materials and restoring springs. A higher deceleration in movement of the ice-accretion surface results in a more effective shattering of ice and breaking of the ice-to-blanket surface bond in tension.

A further advantage is that composite fabrics have a significantly higher erosion resistance than that of elastomers which results in a longer operational life.

To better understand the advantages of using composite fabrics instead of elastomers, it will prove helpful to more fully explore the different physical properties between the two classes of materials. Elastomers are materials whose characteristics resemble rubber. Examples of elastomers that have been used in electro-expulsive de-icer (EEDS) blankets are polyurethane, neoprene and polyester ethylene ketone (PEEK). These materials are capable of significant deformation with a subsequent return to their original size. Unlike solids, these materials are characterized by non-linear moduli of elasticity "E". In tension, E increases rapidly. In compression, the same effect is observed, but the rate of increase of the value of E is typically substantially greater. For example, for a nominal E at zero strain of 4000 pounds per square inch (psi), a tensile strain of 20% could easily yield a local E of 8000 psi whereas in compression, a 20% strain could easily yield a local E of 20,000 psi.

Composite materials are comprised of two or more solid materials typically comprising a resin and a fiber. The physical properties of composites are quite varied and often anisotropic due to the effect of the fiber placement. Composites typically have elasticity moduli ranging from 10 million to 100 million psi for both tension and compression. Strains of 20% will typically cause a composite to fail structurally.

Composite materials are typically much harder than elastomers. Composite hardness can be measured on various ROCKWELL scales which measures surface resistance to deformation. Elastomers, on the other hand, are measured on a SHORE scale which measures energy returned from work done during a deformation.

FIG. 3 is a table showing some elasticity moduli of various fibers and resins used to form composite fabric materials used in the present invention. The overall elasticity moduli of the composite materials is similar to the moduli values of the resin and fiber components. For example, the combination of materials shown in FIG. 3 typically yield composite fabric materials having elasticity moduli ranging from approximately 10 million to 100 million psi. Of course, other materials and combinations thereof may be substituted to yield elasticity moduli ranging from approximately 10 million to 100 million psi. As can be seen from FIG. 3, the elasticity moduli of composite fabric materials are typically in the millions of psi, whereas the elasticity moduli of conventionally used elastomers is typically in the thousands of psi. Hence, composite fabrics are, on average, significantly stiffer or more rigid as compared to elastomers which contributes to greater shedding efficiency.

However, composite fabric blankets have not been utilized thus far in the industry because composite fabrics do not deform as easily as that of elastomers. Some elastic deformation of the blanket's outer layer is necessary so that the blanket does not structurally fail when the blanket is fired. In other words, it is desirable that the outer surface of the blanket can quickly stretch outwardly, decelerate, and return to its original shape without losing its elasticity. Unfortunately, the stiffness of composite fabrics which leads to greater shedding efficiency tends to create undesired "hoop" stress when the composite fabric is stretched outwardly. This hoop stress can easily cause irreparable damage to the blanket.

FIG. 4A illustrates the problem of hoop stress on an airfoil, such as an airplane wing shown in cross section and indicated generally by the reference numeral 100. A composite fabric electro-expulsive blanket 102 covers the front end 104 of the wing 100 where ice accumulation is likely to occur. As can be seen from FIG. 4A, the blanket 102 covers a portion of the wing that has a radius of curvature at the front end 104. Because there is a radius of curvature, firing the blanket 102 moves an ice-accretion surface 106 of the blanket to a greater radius by means of stretching the ice-accretion surface in a direction away from the wing. The stretching of the surface 106 to a greater radius tends to generate excessive hoop stress which can cause the composite fabric blanket 102 to structurally fail because of the blanket's stiffness or high elasticity modulus.

A solution for reducing hoop stress is shown in FIG. 4B which is an enlarged cross section of the wing in FIG. 4A at the front end 104, and rotated 90° clockwise. The enlarged cross section shows a simplified view of the blanket 102 with its inner layers omitted for clarity. The blanket 102 is mounted on the front end 104 of the wing 100 and has a plurality of periodically spaced upper and lower conductor segments 24 and 26 extending in a direction parallel to the ice-accretion surface 106. The blanket 102 has an upper outer layer referenced generally by the numeral 108. The upper outer layer 108 is periodically split, preferably at oblique angles, relative to the ice-accretion surface 106. Each split extends from an inner surface 114 of the upper outer layer 108 to the ice-accretion surface 106. As shown in FIG. 4B, each split forms adjacent overlapping surfaces 110 and 112 in the upper outer layer 108 which are movable relative to each other when the blanket is fired. This motion between the adjacent, overlapping surfaces during blanket firing is a means for limiting hoop stress forces to acceptable levels to prevent damage.

While the present invention has been described in a preferred embodiment, numerous modifications and substitutions can be made without departing from the spirit of the invention. For example, any combination of materials creating a modulus of elasticity approximately within the range of 10 million to 100 million psi can be substituted for the fibers and resins disclosed. Furthermore, the outer layer may be split in other suitable ways to limit hoop stress to acceptable limits. Also, the periodic stitching can be modified in number and placement in order to achieve a high deceleration of the ice-accretion surface of the blanket. Accordingly, the present invention has been described in a preferred embodiment by way of illustration rather than limitation.

I claim:

1. An electro-expulsive blanket for shattering and removing ice and other fungible material from an accretion surface such as an airfoil, comprising:

a composite fabric layer including a lower layer to be attached to a protected surface and an upper layer having an ice-accretion surface to be exposed to the elements, the composite fabric layer having a relatively high modulus of elasticity with respect to elastomeric materials so that energy is efficiently transferred to the composite fabric layer for rapid movement of the upper layer away from the lower layer when the blanket is energized;

a plurality of upper conductor segments periodically spaced from one another and forming two-dimensional patterns extending in a plane parallel to the ice-accretion surface, the upper conductor segments attached to the upper layer;

a plurality of lower conductor segments periodically spaced from one another and forming two-dimensional patterns extending in a plane parallel to the ice-accretion surface, the lower conductor segments attached to the lower layer, each of the lower conductor segments arranged in an underlying relationship to respective upper conductor segments, the upper and lower conductor segments to be connected to one or more power sources and arranged in such a way that the upper conductor segments move rapidly and upwardly away from the lower conductor segments and the lower layer when the upper and lower conductor segments are energized by an electric current, the upwardly moving upper conductor segments transferring their motion to the upper layer and the ice-accretion surface; and stitches connecting the upper layer to the lower layer, the stitches being bowed or slack when the conductor segments are unenergized, the slack of the stitches allowing the upper layer to move rapidly away from the lower layer when the conductor segments are energized until the slack is exhausted and the stitches become taut, and the stitches becoming taut causing the upper layer to rapidly decelerate so as to shatter any ice which may have accumulated on the ice-accretion surface of the blanket.

2. An electro-expulsive blanket as defined in claim 1, wherein the composite fabric upper layer comprises an upper outer layer and an upper inner layer, the upper conductor segments being connected to the upper inner layer, and wherein the composite fabric lower layer comprises a lower outer layer and a lower inner layer, the lower conductor being connected to the lower inner layer, the stitches being connected to the upper inner layer and the lower inner layer.

3. An electro-expulsive blanket as defined in claim 1, further including an electrically insulating layer positioned between the upper and lower conductor segments.

4. An electro-expulsive blanket as defined in claim 1, further including elastomeric material filling a void between the upper and lower conductor segments, the elastomeric material attached to the upper and lower layers.

5. An electro-expulsive blanket as defined in claim 1, wherein the upper and lower layers are made from a composite fabric material having a modulus of elasticity approximately between 10 million and 100 million pounds per square inch.

6. An electro-expulsive blanket as defined in claim 1, wherein the stitches are threads of carbon filament or glass fiber.

7. An electro-expulsive blanket as defined in claim 2, wherein the upper outer layer of the blanket has a plurality of splits extending through the upper outer layer from the ice-accretion surface to a bottom surface of the upper outer layer, the splits being used for limiting hoop stress to acceptable levels when the blanket is fired so that the blanket does not structurally fail.

8. An electro-expulsive blanket as defined in claim 7, wherein the splits extend at oblique angles relative to the ice-accretion surface.

9. An electro-expulsive blanket for shattering and removing ice and other fungible material from an accretion surface such as an airfoil, comprising:

a composite fabric outer layer including a lower outer layer to be attached to a protected surface and an upper outer layer having an ice-accretion surface to be exposed to the elements, the composite fabric outer layer having a relatively high modulus of elasticity with respect to elastomeric materials so that energy is efficiently transferred to the composite fabric layer for rapid movement of the upper outer layer away from the lower outer layer when the blanket is energized;

a composite fabric inner layer including a lower inner layer attached to the lower outer layer and an upper inner layer attached to the upper outer layer;

a plurality of upper conductor segments periodically spaced from one another and forming two-dimensional patterns extending in a plane parallel to the ice-accretion surface, the upper conductor segments attached to the upper inner layer;

a plurality of lower conductor segments periodically spaced from one another and forming two-dimensional patterns extending in a plane parallel to the ice-accretion surface, the lower conductor segments attached to the lower inner layer, each of the lower conductor segments arranged in an underlying relationship to respective upper conductor segments, the upper and lower conductor segments to be connected to one or more power sources and arranged in such a way that the upper conductor segments move rapidly and upwardly away from the lower conductor segments and the lower layers when the upper and lower conductor segments are energized by an electric current, the upwardly moving upper conductor segments transferring their motion to the upper layers and the ice-accretion surface;

an electrically insulating layer positioned between the upper and lower conductor segments;

elastomeric material filling the void between the upper and lower conductor segments and the insulating layer, the elastomeric material attached to the upper and lower inner layers; and stitches for connecting the upper inner layer to the lower inner layer, the stitches being bowed or slack when the conductors are unenergized, the slack of the stitches allowing the upper inner layer to move rapidly away from the lower inner layer when the conductor segments are energized until the slack is exhausted and the stitches become taut, and the stitches becoming taut causing the upper inner layer to rapidly decelerate so as to shatter any ice which may have accumulated on the ice-accretion surface of the blanket.

10. An electro-expulsive blanket as defined in claim 9, wherein the outer and inner layers are made from a composite fabric material having a modulus of elasticity approximately between 10 million and 100 million pounds per square inch.

11. An electro-expulsive blanket as defined in claim 9, wherein the stitches are threads of carbon filament or glass fiber.

12. An electro-expulsive blanket as defined in claim 9, wherein the upper outer layer of the blanket has a plurality of splits extending through the upper outer layer from the ice-accretion surface to a bottom surface of the upper outer layer, the splits being used for limiting hoop stress to acceptable levels when the blanket is fired so that the blanket does not structurally fail.

13. An electro-expulsive blanket as defined in claim 12, wherein the splits extend at oblique angles relative to the ice-accretion surface.

14. A composite fabric electro-expulsive blanket for shattering and removing ice and other fungible material from an accretion surface such as an airfoil, comprising:

a composite fabric outer layer including a lower outer layer to be attached to a protected surface and an upper outer layer having an ice-accretion surface to be exposed to the elements, the composite fabric outer layer having a relatively high modulus of elasticity with respect to elastomeric materials so that energy is efficiently transferred to the composite fabric outer layer for rapid movement of the upper outer layer away from the lower outer layer when the blanket is energized, the upper outer layer of the blanket having a plurality of splits extending through the upper outer layer from the ice-accretion surface to a bottom surface of the upper outer layer, the splits being used for limiting hoop stress to acceptable levels when the blanket is fired so that the blanket does not structurally fail;

a composite fabric inner layer including a lower inner layer attached to the lower outer layer and an upper inner layer attached to the upper outer layer, the outer layer and the inner layer each being made from a composite fabric material having a modulus of elasticity approximately between 10 million and 100 million pounds per square inch;

a plurality of upper conductor segments periodically spaced from one another and forming two-dimensional patterns extending in a plane parallel to the ice-accretion surface, the upper conductor segments attached to the upper inner layer;

a plurality of lower conductor segments periodically spaced from one another and forming two-dimensional patterns extending in a plane parallel to the ice-accretion surface, the lower conductor segments attached to the lower inner layer, each of the lower conductor segments arranged in an underlying relationship to respective upper conductor segments, the upper and lower conductor segments to be connected to one or more power sources and arranged in such a way that the upper conductor segments move rapidly and upwardly away from the lower conductor segments and the lower layers when the upper and lower conductor segments are energized by an electric current, the upwardly moving upper conductor segments transferring their motion to the upper layers and the ice-accretion surface;

an electrically insulating layer positioned between the upper and lower conductor segments;

elastomeric material filling the void between the conductor segments and the insulating layer, the elastomeric material attached to the upper and lower inner layers; and stitches of threads of carbon filament or glass fiber for connecting the upper inner layer to the lower inner layer, the stitches being bowed or slack when the conductor segments are unenergized, the slack of the stitches allowing the upper inner layer to move rapidly away from the lower inner layer when the conductor segments are energized until the slack is exhausted and the stitches become taut, and the stitches becoming taut causing the upper inner layer to rapidly decelerate so as to shatter any ice which may have accumulated on the ice-accretion surface of the blanket.

15. A composite fabric electro-expulsive blanket as defined in claim 14, wherein the splits extend at oblique angles relative to the ice-accretion surface.

* * * * *